United States Patent [19]
Tanaka et al.

[11] Patent Number: 5,173,805

[45] Date of Patent: Dec. 22, 1992

[54] FOCUSING METHOD FOR ZOOM LENS

[75] Inventors: Kazuo Tanaka, Tokyo; Keiji Ikemori, Kanagawa; Masatake Kato, Tokyo, all of Japan

[73] Assignee: Canon Kabushiki Kaisha, Tokyo, Japan

[21] Appl. No.: 580,357

[22] Filed: Sep. 10, 1990

Related U.S. Application Data

[63] Continuation of Ser. No. 341,237, Apr. 18, 1989, abandoned, which is a continuation of Ser. No. 177,823, Mar. 21, 1988, abandoned, which is a continuation of Ser. No. 522,044, Aug. 10, 1983, abandoned.

[30] Foreign Application Priority Data

Aug. 11, 1982 [JP] Japan ............................. 57-140052

[51] Int. Cl.$^5$ ............................................. G02B 15/00
[52] U.S. Cl. ..................................... 359/676; 359/694
[58] Field of Search ............... 350/427, 428; 359/676, 359/686, 689, 694, 695

[56] References Cited

U.S. PATENT DOCUMENTS

| | | | |
|---|---|---|---|
| 3,784,285 | 1/1974 | Watanabe et al. | 350/428 |
| 3,817,600 | 6/1974 | Watanabe et al. | |
| 4,135,786 | 1/1979 | Ikemori | 350/427 |
| 4,198,126 | 4/1980 | Abe et al. | |
| 4,306,776 | 12/1981 | Someya | 350/427 |
| 4,516,839 | 5/1985 | Tokumaru | |

Primary Examiner—Paul M. Dzierzynski
Attorney, Agent, or Firm—Anderson Kill Olick & Oshinsky

[57] ABSTRACT

In the disclosed zoom lens three or more zoom components are located on the image side of a stationary component which is stationary during both focusing and zooming. The three or more zoom components are moved during zooming and are provided into a front portion which is moved for focusing, and a rear portion which remains stationary during focusing. The front focusing portion includes at least two components which move together when focusing, but when zooming move relative to each other so as to change the focal length or power of the front portion. This has the advantageous effect of reducing the difference between the amount the front portion needs to move for focusing at the wide angle position and at telephoto position.

5 Claims, 5 Drawing Sheets

FOCUSING METHOD FOR ZOOM LENS

This is a continuation application of Ser. No. 341,237, filed Apr. 18, 1989, which in turn is a continuation application of Ser. No. 07/177,823 filed Mar. 21, 1988, which in turn is a continuation application of Ser. No 522,044, filed Aug. 10, 1983 all of which are now abandoned.

BACKGROUND OF THE INVENTION

1. Field of the Invention

This invention relates to zoom lenses, and more particularly to focusing methods and means that move one of the zoom components.

2. Description of the Prior Art

In general, many zoom lenses are constructed as illustrated in FIG. 1. Such zoom lenses include, from front to rear, a focusing component 12, a zoom assembly composed of two components 13 and 14, and a fixed component 15. Methods and means of focusing that involve moving the front or first component, i.e. front focusing, offer the advantage that for a given object distance, the focusing component moves a constant distance regardless of the zoom setting of the lens. Allowing for forward movement of the front component when focusing down to shorter object distances, however, requires making the diameter of the front component large. This is a disadvantage.

Previous proposals for decreasing the diameter of the front component suggested focusing with other components other than the front components, for example either with one or both of the zoom components, or using the so-called inner focusing method. One of these proposals, as for example disclosed in U.S. Pat. Nos. 3,391,973 and 4,364,642 is that schematically illustrated in FIG. 2. Here the zoom lens includes a fixed component 22, two zoom components 23 and 24, and a fixed component 25 with a focal plane at 26. This device is focused with either one of the components 23 and 24 or with both of them and comprehends a variation of the total focusing movement during zooming. In general, the longer the focal length of the entire system, the larger the total focusing movement which is required to effect an equivalent result. Therefore, after the zoom lens has focused on a finite object, zooming shifts the position of the image of sharpest focus. In every such event, therefore, the photographer needs to set the focusing actuator so as to correct for the image shift.

Accordingly, conventional rules of design of zoom lenses, though advantageous at minimizing the size of the front component, raise an alternative problem, namely that even for one and the same object distance, the required movement of the focusing component necessarily differs with the zooming position.

Another proposal, that disclosed in Japanese Laid-Open Patent Application Nos. SHO 56-165106 and SHO 56-165107, is that of focusing with one or all of the components that follow the zoom components. This narrows the range of variation of the total focusing movement when zooming.

SUMMARY OF THE INVENTION

An object of the present invention is to provide a focusing method for zoom lenses which, while preserving the use of one of the zoom components for focusing purposes, enables a valuable decrease of the difference between the amount of movement of the zoom component needed for focusing at the wide angle and telephoto positions.

According to the present invention applied to a zoom lens comprising a front or first component which remains stationary during zooming and focusing, followed by a zooming lens assembly comprising a plurality of components which move in different relations to one another, a plurality of components constituting part of the zooming lens assembly and lying at the object side thereof are used as the focusing lens, and all of these components for focusing when zooming are made to move in such relation as in respective individual different developed paths from each other, while when in focusing, they are all made to move as a unit, thus accomplishing the above-stated object.

An important feature of the invention is, therefore, a lens system having on the image side of the fixed or first component, a plurality of movable zooming and focusing components A, whose first two or more components B are axially moved with their air separation varying along with the other component or components C than the aforesaid components B in the aforesaid assembly of components A to effect zooming, and that the aforesaid components B are moved as a unit to effect focusing.

The first component has a positive refractive power so that the diameters of the components that follow the first component are minimized and further the desired zoom ratio is obtained with ease.

The group of components B when in zooming, while functioning as a variator, changes its own overall focal length as the air separation or separations between the successive components in the group is or are changed, and the range of variation of the value of the overall focal length with zooming from the wide angle to the telephoto position is appropriately chosen so as to reduce the range of variation with zooming of the distance the group B moves to effect focusing.

The component C cooperates with the components B to perform zooming, and has a function of compensating for the image shift resulting from the zooming movement of the components B. It also assists in the effective establishment of the desired zoom ratio.

To realize a zoom lens employing the focusing method of the invention, consideration of minimizing the bulk and size of the zoom lens makes it preferable that the number of components in the zooming lens assembly be as small as possible. In this respect, it is recommended that the group B be made up of two components, and the group C be made of one component.

Furthermore in accordance with the present invention, from the point of view of facilitating aberration correction, it is preferable to use an additional component D which remains stationary during zooming and focusing in rear of the zooming lens assembly A.

Another advantage arising the use of the component D is that the entire zoom lens system can be given a specified range of focal lengths and a desired fack focus, and good correction of image aberrations can be made sure.

DESCRIPTION OF THE PREFERRED EMBODIMENTS

Figure 1:
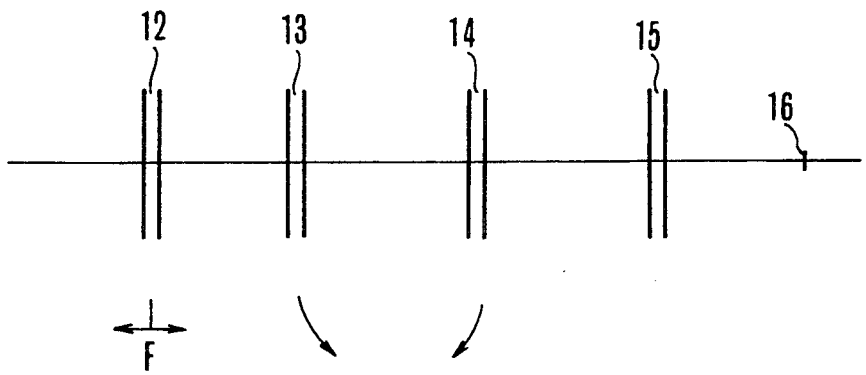
FIGS. 1 and 2 are schematic diagrams of the conventional zoom lenses having the different focusing provisions from each other.
Figure 2:
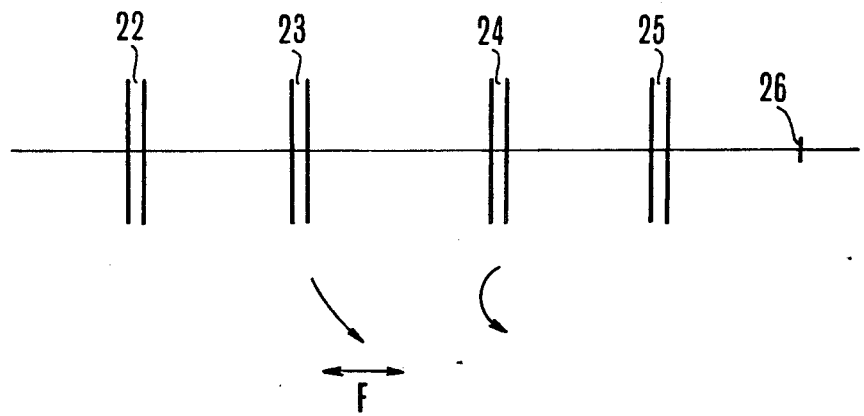
Figure 3:
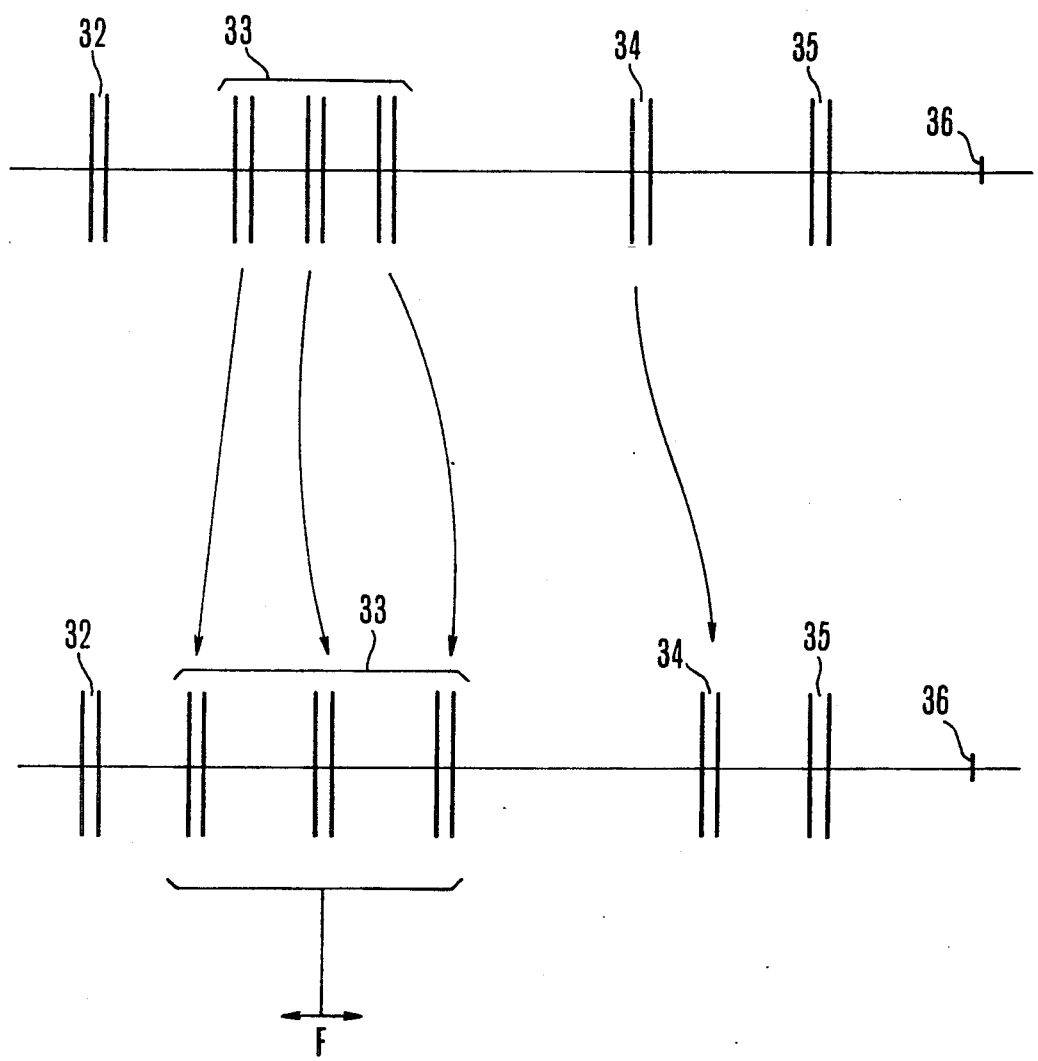
FIG. 3 and 4 are schematic diagrams of different zoom lenses employing the focusing method of the invention.

The present invention will next be described in connection with embodiments thereof by reference to the drawings. In FIG. 3, the zoom lens having the focusing arrangement of the invention includes, from front to rear, a fixed component 32, a zoom lens assembly 33 and 34, and a fixed lens component 35 is not always necessary. Several components constitute a group 33 which are moved while varying their air separations to effect zooming. One or more component or components constitutes or constitute another group 34 and during zooming moves or move as a unit in different relation to the first group 33. Focusing is performed by moving the components in the first group 33 as a unit. It should be pointed out here that the focal length of the group 33 takes different values with different zooming positions, it is when in focusing that the range of variation with zooming of the total focusing movement of the group 33 is reduced.

Another embodiment of a zoom lens according to the present invention is schematically illustrated in FIG. 4(a) for the wide angle position and FIG. 4(b) for the telephoto position.

Figure 4:
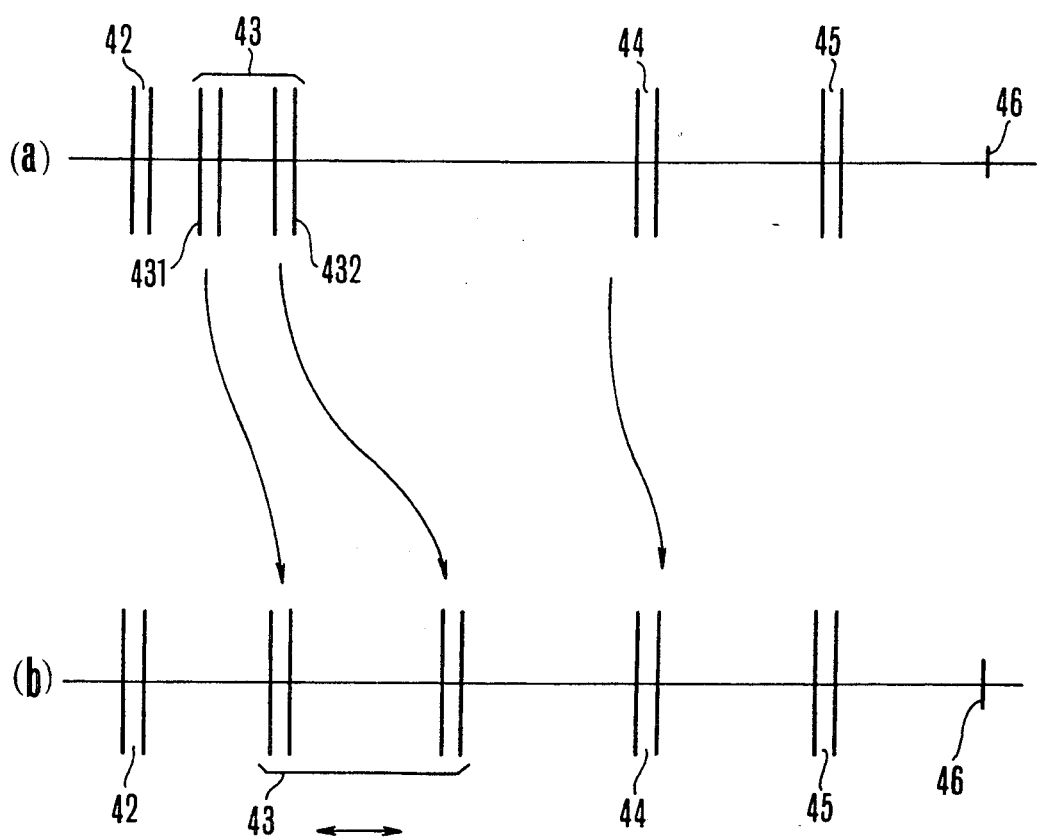

The zoom lens of FIG. 4 has a fixed component 42, two groups of components 43 and 44 movable for zooming, and another fixed component 45, of which the last is not always necessary. The front group 43 has two components 431 and 432, and the rear group 44 is comprised of one component. The front group 43 when in zooming moves while simultaneously changing the air separation between the components 431 and 432 to effect zooming.

Focusing is performed by moving the components 431 and 432 as a unit, where the combined focal length of the components 431 and 432 is varied with zooming so that the range of variation with zooming of the total focusing movement is reduced.

In this embodiment, the refractive power of the group 43 is made negative, and both of the components 431 and 432 are formed to produce a negative refractive power. As zooming from the wide angle to the telephoto position, the air separation between the two components in the group 43 is widened to change the focal length of the lens group 43.

Next, a first numerical example of the embodiment of the invention shown in FIG. 4 is given in Table 1 for the components 42, 431, 432, 44 and 45 with respect to the refractive powers $\phi 42$, $\phi 431$, $\phi 432$, $\phi 44$ and $\phi 45$ respectively along with the air separations l1, l2, l3 and l4 successively from the front in the wide angle position.

TABLE 1

| | |
|---|---|
| $\phi 42 = 0.00923$ | l1 = 9.5 |
| $\phi 431 = -0.0147$ | l2 = 2.0 |
| $\phi 432 = -0.015$ | l3 = 42.1 |
| $\phi 44 = 0.0106$ | l4 = -17.5 |

TABLE 1-continued

| | |
|---|---|
| $\phi 45 = 0.00845$ | | f = 70–140

Figure 5:
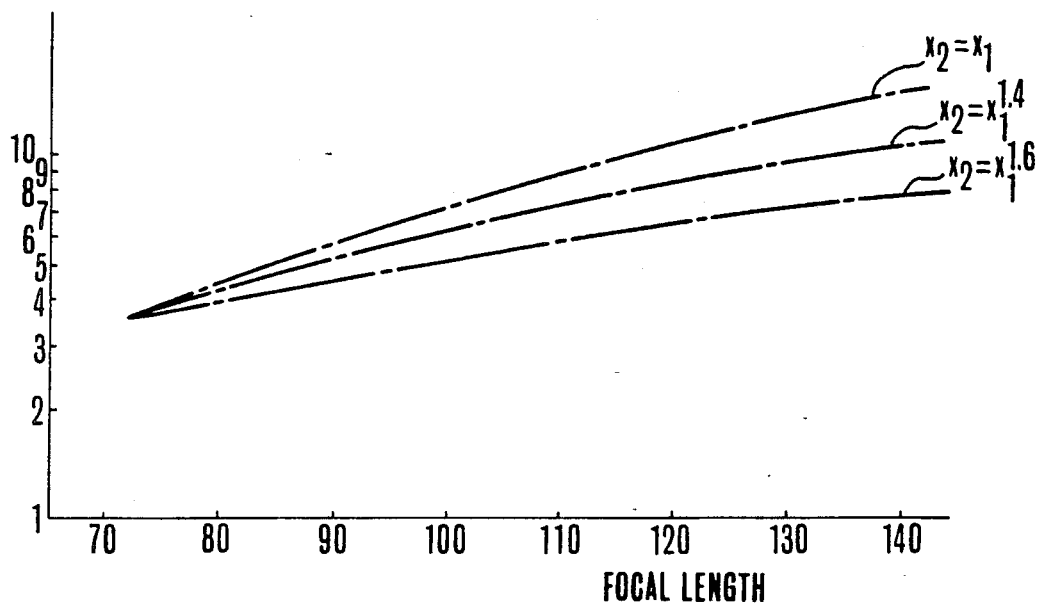
FIGS. 5, 6 and 7 are graphs illustrating what value of reduction in the range of variation with zooming of the total focusing movement is achieved in the respective embodiments of the invention.

With the zoom lens specified in Table 1, when the front group 43 is moved to effect focusing, the required value of the distance from a position for an infinitely distant object to another position for an object at a distance of −1 meter measured from the image plane varies with zooming as shown in FIG. 5 where the ordinate is the focusing movement and the abscissa is the focal length of the entire system with parameters $X_1$ and $X_2$ in the movement of the components 431 and 432 respectively. The one of the three curves which is labelled $X_2 = X_1$ represents the conventional focusing method in which the components 431 and 432 when in zooming move by respective distances equal to each other, or as a unit.

As is evident from FIG. 5, when the components 431 and 432 are otherwise moved axially but in a relation such as $X_2 = X_1^{1.4}$ or $X_2 = X_1^{1.6}$ during zooming, the range of variation with zooming of the total focusing movement of the group 43 is appreciably reduced from that when $X_2 = X_1$.

Figure 6:
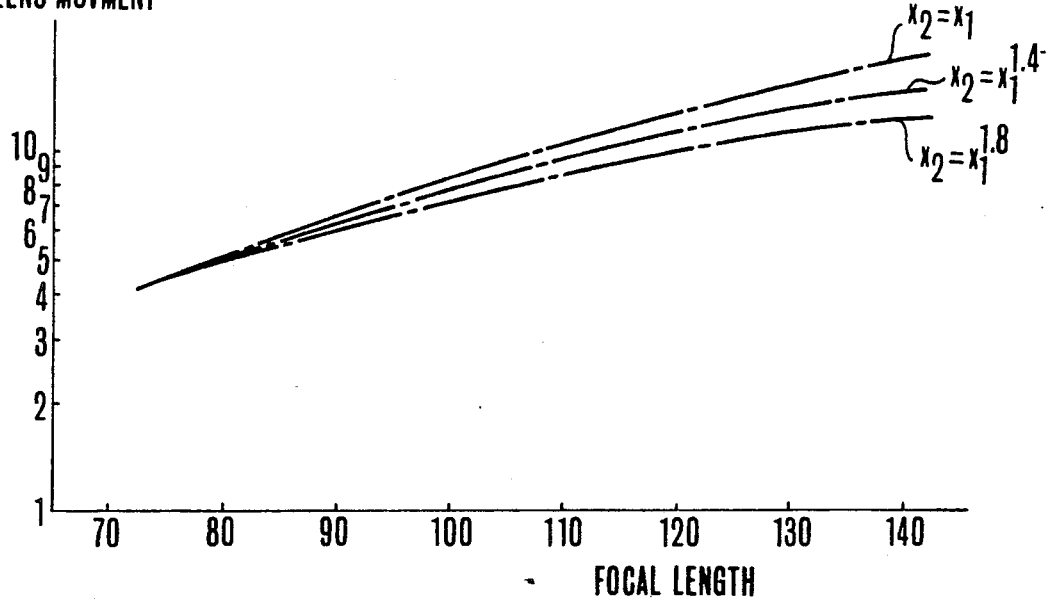

FIG. 6 is similar to FIG. 5 except that the components of the zoom lens of FIG. 4 are specified in Table 2 with respect to the similar dimensions to those shown in Table 2.

TABLE 2

| | |
|---|---|
| $\phi 42 = 0.00923$ | l1 = 9.5 |
| $\phi 431 = -0.009$ | l2 = 2.0 |
| $\phi 432 = -0.0198$ | l3 = 42.1 |
| $\phi 44 = 0.0106$ | l4 = -17.5 |
| $\phi 45 = 0.00845$ | | f = 70–140

Figure 7:
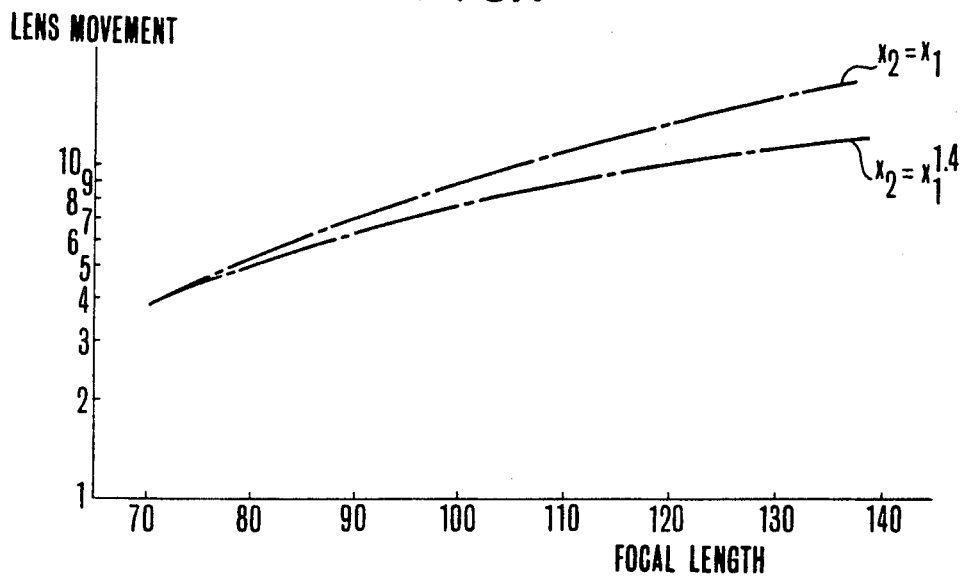

FIG. 7 also shows a comparison of the range of variation with zooming of the total focusing movement of the group 43 in the zoom lens of FIG. 4 when specified as in Table 3 below according to the present invention with the prior art. The dimensions are denoted by the similar reference characters to those employed in Table 1.

TABLE 3

| | |
|---|---|
| $\phi 42 = 0.00923$ | l1 = 9.5 |
| $\phi 431 = -0.0198$ | l2 = 2.0 |
| $\phi 432 = -0.009$ | l3 = 42.1 |
| $\phi 44 = 0.0106$ | l4 = -17.5 |
| $\phi 45 = 0.00845$ | |

Figure 8:
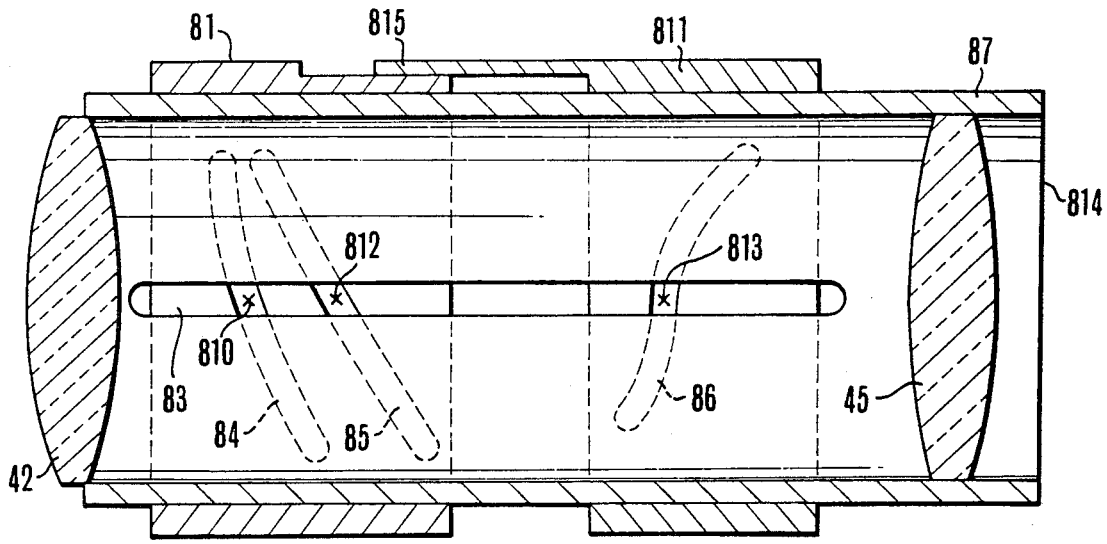
FIG. 8 is a longitudinal section view of a mechanical mounting with a focusing control mechanism for the zoom lens of the invention.

FIG. 8 schematically illustrates an operating mechanism for those of the components of the zoom lens of FIG. 4 which move when zooming and/or when focusing. A longitudinally elongated slot 83 is provided through the wall of a body tube 87 with a flange surface 814 at the rear end thereof. The first and last components 42 and 45 are fixedly secured to the tube 87. Movably fitted on the outer diameter of the tube 87 are two sleeves 81 and 811 of which the front is provided with camming grooves 84 and 85 for the components 431 and 432 respectively, and the rear is provided with a camming groove 86 for the component 44.

Pins 810, 812 and 813 extend from lens holders for the components 431, 432 and 44 respectively through the common slot 83 into the respective camming grooves 84, 85 and 86. The front sleeve 81 is made axially movable relative to the rear sleeve 811 which is retained from axial movement through a drive connection of such form that a projection 815 of the sleeve 811 is fitted in a key provided in the outer surface of the sleeve 81.

Focusing is carried out by axially moving the front sleeve 81 so that the components 431 and 432 in the front group 43 are driven by the respective pins 810 and 812 to move as a unit. Zooming is carried out by turning the sleeves 81 and 811 as a unit about the optical axis so that the components 431, 432 and 44 are moved in different relation to one another.

It will be appreciated that according to the present invention, two or more components constituting a variator are made to move axially in different relation to each other such that the range of variation with the total focusing movement falls in the depth of focus. Hence the operating mechanism is greatly simplified in structure despite employment of the inner focusing method.

What we claim is:

1. A zoom lens comprising:
   a component which remains stationary during zooming and focusing; and
   a zoom lens assembly on the image side of said stationary component, said zoom lens assembly comprising at least three zoom components movable differentially from each other for zooming, said assembly having a front part comprising said zoom components movable during focusing, and a rear part on the image side of said front part, said rear part being stationary during focusing,
   all of said zoom components in said front part, when zooming, being moved in relation to each other such as to change the focus length of the front part, and when focusing being moved as a unit.

2. A zoom lens as in claim 1, wherein all the components consituting said front part, when zooming, move so as to vary the distance between successive two of said components.

3. A zoom lens comprising:
   a first component which is stationary during zooming and focusing;
   a second component on the image side of said first component, arranged upon zooming, to move for varying the focal length of the entire system, said second component having at least two members which, when zooming, move for different distances and, when focusing, are made to move as a unit;
   a third component on the image side of said second component arranged to move for maintaining the constant position of the image plane only when zooming said and arranged to be stationary during focusing; and
   a fourth component on the image side of said third component and arranged to be stationary during zooming and focusing, wherein said two members and said third component move differentially from each other for zooming.

4. A zoom lens as in claim 3, wherein said second component comprises, from front to rear, a first member and a second member, and said third component consists of one movable member.

5. A zoom lens as in claim 4, wherein said first and said second member have negative powers and when zooming from a wide angle end to a telephoto end, said first and said second member arranged to move relative to each other such that a separation between said first and said second members widens.

* * * * *

UNITED STATES PATENT AND TRADEMARK OFFICE
CERTIFICATE OF CORRECTION

PATENT NO. : 5,173,805
DATED : December 22, 1992
INVENTOR(S) : Kazuo Tanaka, et al It is certified that error appears in the above-indentified patent and that said Letters Patent is hereby corrected as shown below:

On the title page, it should read:

[75]   Inventors:   Kazuo Tanaka, Tokyo; Keiji Ikemori, Kanagawa; Masataka Kato, Tokyo; Tsunefumi Tanaka, Kanagawa, all of Japan Signed and Sealed this Eighth Day of March, 1994

*Attest:*

BRUCE LEHMAN

*Attesting Officer*        *Commissioner of Patents and Trademarks*